Sept. 20, 1960 R. N. BRETOI 2,953,326
SPIRAL STABILITY AUGMENTERS FOR IMPROVING AIRCRAFT
SPIRAL STABILITY AND DUTCH ROLL CHARACTERISTICS
Filed Feb. 10, 1955

*INVENTOR.*
REMUS N. BRETOI
BY Gordon Reed

*ATTORNEY*

United States Patent Office 2,953,326
Patented Sept. 20, 1960

2,953,326

SPIRAL STABILITY AUGMENTERS FOR IMPROVING AIRCRAFT SPIRAL STABILITY AND DUTCH ROLL CHARACTERISTICS

Remus N. Bretoi, Minneapolis, Minn., assignor to Minneapolis-Honeywell Regulator Company, Minneapolis, Minn., a corporation of Delaware Filed Feb. 10, 1955, Ser. No. 487,351

3 Claims. (Cl. 244—77)

This invention relates to automatic flight control apparatus for an aircraft and particularly to apparatus for improving the spiral stability and Dutch roll characteristics of an aircraft.

A craft has spiral instability when, due to a dropping of a wing initially as when affected by a wind gust, it follows of itself a spiral flight path of increasing bank attitudes or in other words a tightening spiral.

Dutch roll characteristics or oscillations are the result of a combined yawing and rolling motion. Dutch roll may be initiated by a yawing of the craft about its vertical or turn axis. This yawing causes one wing to advance forward in the direction of flight with respect to the other. Because of wing dihedral, or effective wing dihedral, the advanced wing will rise.

If we consider the right wing to be the rising one, the application of a roll control tending to raise the left wing would reduce the rolling motion of the craft, thereby improving its Dutch roll characteristics.

Spiral instability and Dutch roll characteristics may be improved by the use of existing three channel autopilots that automatically control the ailerons, rudder, and elevator surfaces of an aircraft. Such autopilots stabilize the craft about its roll, turn, and pitch axes by suitable angular change responsive devices. However, one object of this invention is to provide a single automatically responsive device operable in a single channel of the aircraft for improving the spiral stability and Dutch roll characteristics of the aircraft.

A further object of this invention is to operate the aileron control surfaces of an aircraft automatically to improve its spiral stability and Dutch roll characteristics.

The invention is further characterized by controlling the operation of the aileron surfaces from apparatus in accordance with the yaw or turn rate of the craft. This turn rate effect may be modified so that a lagged turn rate response controls the operation of the ailerons.

A further object of the invention is to provide for the operation of the aileron control surfaces, alternatively to the above arrangement, in accordance with the aircraft angular rate about its roll or longitudinal axis along with the rate of operation of the positioning motor for said surfaces.

Another object of this invention is to position the aileron control surfaces differentially from such novel apparatus or to permit manual operation thereof.

The above and further objects of the invention and the novel means whereby it may be accomplished will be evident from a consideration of the following description and accompanying drawing.

Figure 1:
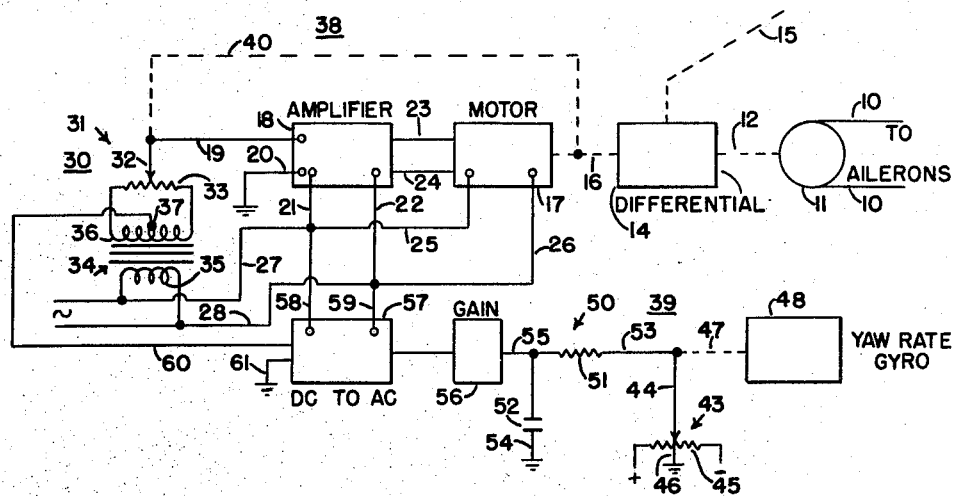
Figure 1 illustrates a servo mechanism controlled from the craft yaw rate for operating the aileron control surfaces.

The following detailed description may be read in connection with the drawing and referring to Figure 1, devices for controlling the control attitude of an aircraft such as aileron control surfaces (not shown) may be positioned by cables 10 extending therefrom to a cable drum 11 which is operated by an output member 12 of a differential device 14. The differential device 14 includes a manual input controller 15 and a second input controller 16 operated by the roll stabilizing apparatus 38. Differential devices which permit the operation of two inputs independently and the operation of which is differentially applied to an output have been heretofore used in aircraft control devices. One example of such device is the differential 17 in U.S. Patent No. 2,613,751 to Donovan et al., see Figure 4.

The automatic stabilizing apparatus 38 comprises a motor for positioning the control member 16, the motor in turn being controlled by an amplifier 18. The amplifier and motor constitute part of a servo mechanism. One control signal therefor is supplied by a rebalancing device 31 and the other control signal is provided by a lagged yaw rate device 39 comprising a signal source 43 providing a signal proportional to the craft yaw rate and a passive electrical lag device 50 which in a sense integrates the output from signal source 43. The output from the lag device 50 is summed with that from the signal source 31 for controlling the amplifier 18.

The motor 17 may be a conventional capacitor type induction motor comprising a pair of field windings and a rotor operatively connected to control member 16. The motor is reversibly controlled by a conventional amplifier 18 which may be of the A.C. discriminator type. The amplifier includes a pair of control electrodes connected to two control signal input conductors 19, 20. The amplifier is also connected to a pair of A.C. power input conductors 21, 22. The output from the amplifier 18 is supplied to one winding of motor 17 by means of suitable conductors 23, 24. The remaining winding of the motor 17 is connected to the A.C. supply by sub conductors 25, 26 which are connected to main supply conductors 27, 28. The amplifier power conductors 21, 22 are also connected to the main supply conductors 27, 28. The motor 17 rotates in one or the other direction depending upon the phase relationship of the A.C. voltage across signal input conductors 19, 20 with respect to the A.C. voltage across power input conductors 21, 22. The amplifier control electrods conductors 19, 20 are connected to a balanceable control signal network 30. The network 30 comprises two signal sources 31 and 43. Signal source 31 provides a rebalancing signal and comprises a potentiometer having an operable slider 32 and resistor 33 which is connected across a secondary winding 36 of a transformer 34 having a primary winding 35. The primary winding 35 is connected to the A.C. voltage supply lines 27, 28. Slider 32 is positioned by suitable operating means 40 from the output control member 16 of motor 17. The slider 32 which is connected to conductor 19 is positioned in either direction from the electrical center of resistor 33 having a potential the same as a center tap 37 of secondary winding 36.

Signal source 43 comprises a potentiometer having an adjustable slider 44 and resistor 45 connected to a suitable D.C. supply. Slider 44 is positioned along resistor 45 in either direction from a center tap 46 thereof by a suitable operating means 47 extending from a yaw or turn rate gyroscope 48. The rate signal output from the signal source 43 is applied to combining means comprising a lag or time phase shifting network 50 which comprises a resistor 51 and capacitor 52 connected in series. The transfer function of such network 50 is $$\frac{1}{j\omega CR+1}$$

The remaining end of resistor 51 is connected through conductor 53 to slider 44 and the remaining end of capacitor 52 is connected through a conductor 54 to ground which is common to the ground connection for center tap 46 of resistor 45. The junction of resistor 51 and capacitor 52 has a conductor 55 extending therefrom and through a gain control 56 such as a voltage dividing potentiometer to a D.C. to A.C. converter 57. The converter 57 may be a simple vibrator having its operating winding connected by means of conductors 58, 59 to the A.C. supply conductors 27, 28 whereby it modulates the D.C. input control signal from the gain control device 56. The modulated signal from converter 57 appears across the output conductor 60, 61 thereof. The conductor 60 connects with the center tap 37 of secondary winding 36 to effect series summing of the rebalancing and modulated rate signals and the conductor 61 is connected to ground and thus common with the amplifier electrode ground conductor 20 to complete the control circuit for amplifier 18.

Figure 2:
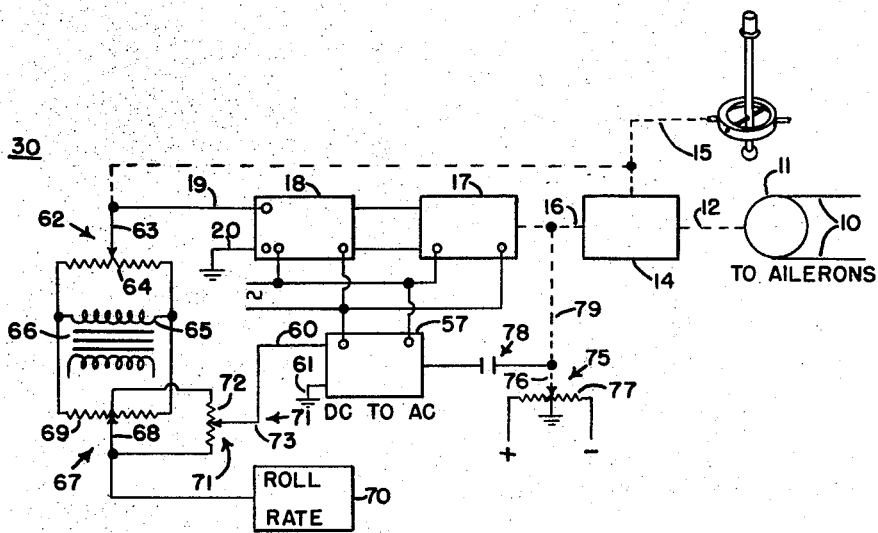
Figure 2 illustrates a modification of Figure 1 wherein such servo mechanism is controlled in accordance with the craft roll rate and rate of operation of the servo mechanism.

Figure 2 is like Figure 1 but for a modification of the apparatus 38. In Figure 2, the aileron control surfaces again are operated by operating means 10 extending from the cable drum 11 driven by the output member 12 of a differential device 14 having a direct manual input 15 and an automatically operated input 16. The input control member 16 is operated by the motor 17 which in turn is controlled from the amplifier 18. The amplifier control circuit of Figure 2 differs from control circuit 30 of Figure 1 in that control signals are supplied by a control stick position voltage source or pickoff 62, a roll rate pickoff 67, and a servo position feedback pickoff 75. The pickoff 62 is a potentiometer comprising an adjustable slider 63 and resistor 64 which is connected across a secondary winding 65 of a transformer 66. Slider 63 is positioned in either direction from the electrical center of resistor 64 from the conventional control stick of the craft. Amplifier electrode conductor 19 is connected to slider 63. Connected in parallel with resistor 64 across the secondary winding 65 is a potentiometer resistor 69 of the pickoff 67. The pickoff includes an adjustable slider 68 positioned in either direction from the electrical center of resistor 69 from a roll rate gyroscope 70. The direction of the displacement of slider 68 from the electrical center depends upon the direction of craft roll and its extent of displacement depends upon the magnitude of the craft's roll rate. A gain potentiometer 71 includes a resistor 72 connected between a center tap of resistor 69 and slider 68. Adjustable tap 73 may be displaced along resistor 72 to select any ratio of the signal developed in pickoff 67 from operation of the rate gyroscope 70. The D.C. to A.C. converter 57 has one output conductor 60 connected to adjustable tap 73 and its other output conductor 61 is connected to ground which again is common with the ground of amplifier electrode conductor 20. The input control signal supplied to converter 57 and which is to be modulated is derived from the servomotor feedback pickoff 75 comprising an adjustable potentiometer slider 76 and resistor 77. Slider 76 is positioned along resistor 77 in either direction from the electrical center thereof by a suitable operating means 79 extending from control member 16 which may be the motor shaft. Slider 76 assumes a position relative to the electrical center of resistor 77 in accordance with the displacement of motor 17 from a normal position. The signal developed between slider 76 and the resistor center tap is applied through a combining means comprising a time phase shifting network termed a high pass feedback in the form of a capacitor 78 to the D.C. to A.C. converter 57. The high pass network should have a transfer function or ratio of output to input in the form $$\frac{TS}{1+TS}$$

where T is a time constant and S is the differential operator $d/dt$.

The operation of the arrangement of Figure 1 insofar as it positions the aileron control surfaces in accordance with the rate of turn of the aircraft as modified by the lagged rate network may be understood generally. However, the purpose in using the lagged rate network may require explanation or amplification. The explanation is approached as stated below.

If we increase the effective dihedral of the airplane by operating the ailerons, spiral stability is improved, but this method has certain disadvantages. If we utilize a side slip sensing device for controlling the ailerons, we encounter threshold problems in deriving a control signal for small values of side slip angle. For example, a high speed airplane in a steady state bank of 30° particularly at high speeds and with the rudder surface streamlined, will probably have a side slip angle of less than 0.1°. In order to control spiral stability with side slip sensor control to aileron, it is therefore necessary to measure side slip angles to substantially less than 0.1° and position the ailerons to very great accuracy. In addition to being thus impractical to mechanize, feeding side slip angle to control ailerons has also an undesirable effect on lateral handling characteristics of the craft, since increased effective dihedral is conducive to Dutch roll.

A second possible method of improving spiral stability involves deflecting the ailerons proportional to yaw rate of the aircraft. This has the disadvantage of increasing the amplitude of the rolling motion during the Dutch roll oscillation.

However, at Dutch roll frequencies yaw angle and sideslip angle are very close in amplitude and phase. To take advantage of this relationship the yaw rate signal is lagged in such a manner that for purposes of spiral stability augmentation the signal is similar to yaw rate, and at Dutch roll frequencies the signal is similar to the integral of yaw rate, which is yaw angle which is similar to sideslip angle. This signal can be used to deflect the ailerons in such a direction to provide spiral stability. This same signal in effect decreases the effective dihedral of the airplane at Dutch roll frequencies. In this way both spiral stability and Dutch roll stability are improved.

During manually initiated changes in craft heading, the displacement of manual controller 15 to command a given bank angle will be substantially balanced by the control from apparatus 38 derived from the yaw or turn rate gyro 48 since for small bank angles the bank angle and rate of turn are substantially in proportion. Thus in the steady state part of the turn, the ailerons will be returned to normal position.

During stabilizing operation, the yaw rate gyro will continue to exert a control while the craft is turning, to position the ailerons to prevent turning.

The arrangement in Figure 2 is characterized by roll rate response applied to aileron control along with high passed aileron servo position feedback (integrating servo). In Figure 2, because of the servo displacement rate feedback which opposes the roll rate response, the ailerons will be positioned at a rate proportional to the magnitude of the roll rate of the craft. Thus roll disturbances are quickly corrected.

The devices of Figures 1 and 2 have a useful function under instrument weather flying conditions where the airplane pilot may be unaware, because of poor visual conditions, of the fact that his aircraft is maneuvering into a converging spiral of increasing tightness. The arrangement of Figure 2 will also provide in effect a roll autopilot, and hence reduce the roll amplitude during Dutch roll oscillations. It will also provide spiral stability within system threshold, that is for example, if the system threshold is 0.1° per second roll rate, the airplane can drift off from level flight at the rate of 6° per minute. This low drift rate should not be objectionable since the pilot maintains manual control through operating input 15 to the differential 14.

Additionally if desired, we may sum the stick signal from pickoff 62 with the roll rate signal from pickoff 67 if a roll rate response of the craft to the control stick input is desired.

By utilizing the servo rate feedback or high passed servo position feedback of Figure 2, the ailerons may assume a steady state position after an initial roll which will increase the lift on one or the other wings of the aircraft tending to prevent further dropping of such wing which would otherwise initiate the movement of the craft into a spiral. For example, if the craft rolls, the roll rate gyro 70 applies a control which is balanced by the servomotor displacement rate. When the aileron as displaced by the motor stops the craft from rolling, the rate gyro signal is no longer present to cause motor operation, and the ailerons remain as displaced if no further rolling motion occurs.

It will now be apparent that there has been disclosed novel apparatus for improving the spiral stability and Dutch roll characteristics of an aircraft and it is further evident that there may be made numerous changes in the above arrangement by those skilled in the art without departing either in spirit or scope from the present invention. Hence, it is intended that all matter described in the foregoing arrangements shall be considered as illustrative and not in a limiting sense.

What is claimed is:

1. Control apparatus for an airplane having aileron control surfaces and differential means having two input members and an output member connected to said control surfaces and pilot operated means connected to one input, said airplane having wing surfaces which during flight and rotation of the airplane about its turn axis causes one wing to advance forward relative to the other, said apparatus comprising power means connected to said other differential input; a gyroscope responsive to the yaw rate of the craft; a signal generator operated by said gyroscope to provide a signal proportional to craft yaw rate; a phase shifting network having a transfer function in the form $$\frac{1}{j\omega CR+1}$$

connected to said signal generator and providing a second signal lagged in phase with respect to the first signal and means for controlling said power means from said second signal for operating said ailerons while said pilot operated control means remains stationary.

2. Apparatus for improving the spiral stability and Dutch roll characteristics of an aircraft having wing surfaces which during flight and on rotation of the craft about its turn axis causes one wing to advance forward with respect to the other, said aircraft having aileron control means for controlling its movements about its longitudinal axis, said apparatus comprising motor operated means for operating said aileron control means, an amplifier reversibly controlling said motor means, a gyroscope responsive to the rate of turn of the craft about its normally vertical or turn axis, a signal source operated by said gyroscope to provide a turn rate signal, a lag network having a transfer function of the form $$\frac{1}{j\omega CR+1}$$

connected to said signal source for providing a second signal lagged in time with respect to said turn rate signal; a third signal source operated in accordance with the displacement of said motor means from a normal position; and means for controlling said amplifier and controlled from only said second and third signals.

3. In apparatus for dumping spiral instability and Dutch roll of an airplane having wing surfaces which during flight and rotation of the craft about its turn axis causes one wing to advance forward with respect to the other, said airplane having roll controlling aileron surfaces, differential means having two independent inputs and an output connected to the aileron surfaces; a manually operable member connected to one input of said differential means; a motor connected to the other input of said differential means; means providing a measure of the displacement of the motor from a normal position; control means operating the motor and responsive to the displacement measuring means; a rate device providing a signal proportional to the angular rate of the craft about its turn axis; further means including a lag device having a transfer function $$\frac{1}{j\omega CR+1}$$

connected to the rate device providing a signal at Dutch roll frequencies similar to the time integral of the signal from the rate device; and means for connecting the further means to said control means and feeding the signal therefrom in opposition to the signal from the measuring means.

References Cited in the file of this patent

UNITED STATES PATENTS

| | | |
|---|---|---|
| 2,733,878 | Ciscel | Feb. 7, 1956 |
| 2,740,082 | Sedgfield | Mar. 27, 1956 |

FOREIGN PATENTS

| | | |
|---|---|---|
| 679,586 | Great Britain | Sept. 17, 1952 |